United States Patent
Lee et al.

(10) Patent No.: US 11,241,659 B2
(45) Date of Patent: Feb. 8, 2022

(54) METHOD FOR MANUFACTURING GAS SEPARATION MEMBRANE AND GAS SEPARATION MEMBRANE MANUFACTURED THEREBY

(71) Applicant: LG CHEM, LTD., Seoul (KR)

(72) Inventors: Byoungsoo Lee, Daejeon (KR); Sora Bang, Daejeon (KR); Chong Kyu Shin, Daejeon (KR); Keun Won Song, Daejeon (KR); Hyungbae Gil, Daejeon (KR)

(73) Assignee: LG CHEM, LTD., Seoul (KR)

(*) Notice: Subject to any disclaimer, the term of this patent is extended or adjusted under 35 U.S.C. 154(b) by 61 days.

(21) Appl. No.: 16/755,969

(22) PCT Filed: Nov. 7, 2018

(86) PCT No.: PCT/KR2018/013445
§ 371 (c)(1),
(2) Date: Apr. 14, 2020

(87) PCT Pub. No.: WO2019/093750
PCT Pub. Date: May 16, 2019

(65) Prior Publication Data
US 2020/0238219 A1    Jul. 30, 2020

(30) Foreign Application Priority Data
Nov. 7, 2017   (KR) .................... 10-2017-0147530

(51) Int. Cl.
*B01D 53/22*     (2006.01)
*B01D 67/00*     (2006.01)
(Continued)

(52) U.S. Cl.
CPC ....... *B01D 67/0002* (2013.01); *B01D 53/228* (2013.01); *B01D 69/10* (2013.01); *B01D 71/22* (2013.01); *B01D 2323/02* (2013.01)

(58) Field of Classification Search
CPC .... B01D 71/22; B01D 69/10; B01D 67/0002; B01D 53/228; B01D 2323/02
See application file for complete search history.

(56) References Cited

U.S. PATENT DOCUMENTS 3,307,949 A * 3/1967 Schlesinger ............ C07C 39/11
430/163
4,536,907 A * 8/1985 Zumbrunn ............. D06B 19/00
8/149.1
(Continued)

FOREIGN PATENT DOCUMENTS

| CN | 85106044 | 3/1987 |
| CN | 101516482 | 8/2009 |

(Continued)

*Primary Examiner* — Anthony R Shumate
(74) *Attorney, Agent, or Firm* — Dentons US LLP

(57) ABSTRACT

Provided is a method for preparing a gas separation membrane, the method including forming a porous layer by coating a hydrophilic polymer solution on a porous substrate; and forming an active layer by coating a composition for forming an active layer including a polymer of Chemical Formula 1 on the porous layer,

[Chemical Formula 1]

(Continued)

wherein in Chemical Formula 1, n is the number of a repeating unit, and is an integer of 500 to 3,000, and R1 to R5 are the same as or different from each other, and each independently is hydrogen, an alkyl group, or —(C=O)R6, and R6 is an alkyl group, wherein the polymer of Chemical Formula 1 is included in an amount from 1% by weight to 5% by weight based on the composition for forming an active layer, and a gas separation membrane prepared using the same.

13 Claims, 1 Drawing Sheet

(51) Int. Cl.
  *B01D 69/10* (2006.01)
  *B01D 71/22* (2006.01)

(56) References Cited

U.S. PATENT DOCUMENTS

| | | | |
|---|---|---|---|
| 4,881,954 A | 11/1989 | Bikson et al. | |
| 4,943,475 A | 7/1990 | Baker et al. | |
| 5,714,301 A * | 2/1998 | Boroson | B41M 5/42 430/201 |
| 5,846,836 A * | 12/1998 | Mallow | G01N 31/223 436/169 |
| 6,677,159 B1 * | 1/2004 | Mallow | G01N 31/223 436/133 |
| 2008/0005854 A1 * | 1/2008 | Fernandez Cid | D06P 1/0004 8/544 |
| 2008/0083265 A1 * | 4/2008 | Ostrowski | G01N 33/004 73/23.3 |
| 2009/0255405 A1 | 10/2009 | Qiu et al. | |
| 2011/0272841 A1 * | 11/2011 | Chen | C09D 133/14 264/101 |
| 2013/0020243 A1 | 1/2013 | Han et al. | |
| 2014/0259212 A1 * | 9/2014 | Plesch | C12P 1/00 800/278 |
| 2014/0332708 A1 | 11/2014 | Son et al. | |
| 2014/0343272 A1 | 11/2014 | Song et al. | |
| 2015/0165369 A1 | 6/2015 | Van Kessel et al. | |
| 2016/0152008 A1 * | 6/2016 | Ogata | B29D 99/005 428/337 |
| 2018/0147546 A1 | 5/2018 | Kodama et al. | |
| 2019/0377183 A1 * | 12/2019 | Sharp | G02B 27/283 |
| 2020/0291901 A1 * | 9/2020 | Song | F02M 21/0215 |
| 2021/0039070 A1 * | 2/2021 | Gottschall | B01J 20/3204 |

FOREIGN PATENT DOCUMENTS

| | | |
|---|---|---|
| CN | 102886213 | 1/2013 |
| CN | 103706263 | 4/2014 |
| DE | 10-2006-044635 | 3/2008 |
| EP | 0174918 A1 | 3/1986 |
| EP | 0301597 A2 | 2/1989 |
| JP | S61-54222 | 3/1986 |
| JP | H01-111421 | 4/1989 |
| JP | 2009-263598 | 11/2009 |
| JP | 2014176795 | 9/2014 |
| JP | 2015508430 | 3/2015 |
| JP | 2015-522410 | 8/2015 |
| JP | 2017136546 | 8/2017 |
| KR | 10-1993-0003213 | 4/1993 |
| KR | 10-1132731 | 6/2012 |
| KR | 10-20130078469 | 7/2013 |
| KR | 10-20130137238 | 12/2013 |
| KR | 10-20150069422 | 6/2015 |
| KR | 10-20150080311 | 7/2015 |
| KR | 10-2016-0044661 | 4/2016 |
| KR | 10-20170096652 | 8/2017 |
| WO | 2012173766 | 12/2012 |
| WO | 2014-001796 | 1/2014 |
| WO | 2014-141868 | 9/2014 |
| WO | 2015-049498 | 4/2015 |
| WO | 2017-038285 | 3/2017 |

* cited by examiner

【FIG. 1】
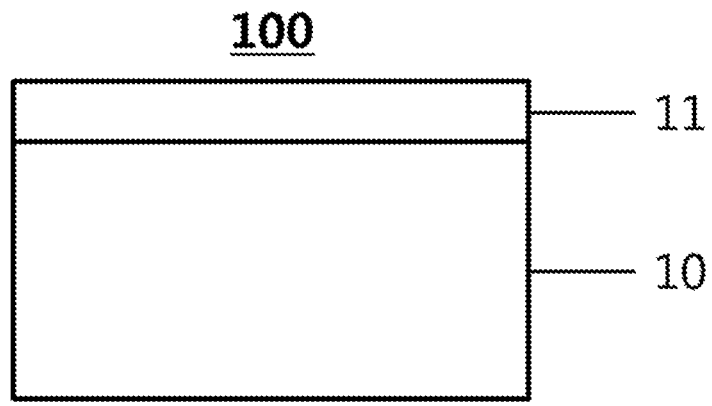
【FIG. 2】
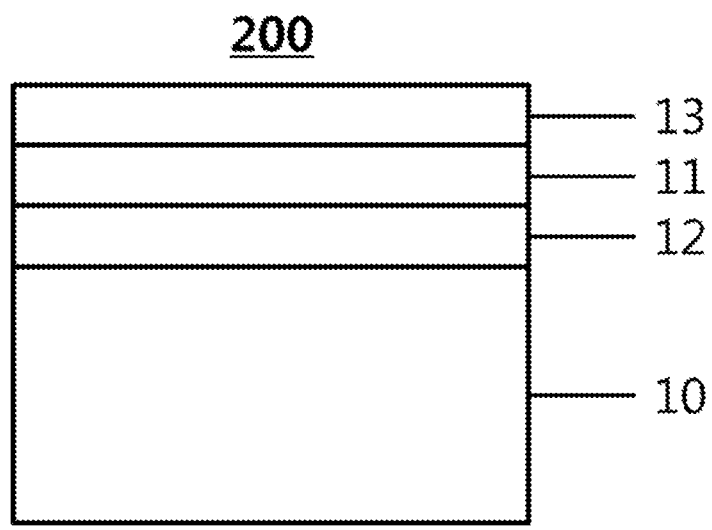

METHOD FOR MANUFACTURING GAS SEPARATION MEMBRANE AND GAS SEPARATION MEMBRANE MANUFACTURED THEREBY

CROSS-REFERENCE TO RELATED APPLICATIONS

This application is a National Stage Application of International Application No. PCT/KR2018/013445 filed on Nov. 7, 2018, which claims priority to and the benefits of Korean Patent Application No. 10-2017-0147530, filed with the Korean Intellectual Property Office on Nov. 7, 2017, the entire contents of which are incorporated herein by reference.

TECHNICAL FIELD

The present specification relates to a method for preparing a gas separation membrane, and a gas separation membrane prepared using the same.

BACKGROUND

A gas separation membrane is formed with a support layer, an active layer and a protective layer, and is a membrane separating gases selectively from a gas mixture using a pore size and structural properties of the active layer. Accordingly, gas permeability and selectivity are used as important indicators representing performance of the membrane, and such performance is largely affected by polymer materials forming the active layer.

Accordingly, development of methods for increasing permeability and selectivity of a gas separation membrane has been required.

BRIEF DESCRIPTION

Technical Problem

The present specification describes a method for preparing a gas separation membrane, and a gas separation membrane prepared using the same.

Technical Solution

One embodiment of the present specification provides a method for preparing a gas separation membrane including forming a porous layer by coating a hydrophilic polymer solution on a porous substrate; and forming an active layer by coating a composition for forming an active layer including a polymer of the following Chemical Formula 1 on the porous layer, wherein the polymer of Chemical Formula 1 is included in an amount from 1% by weight to 5% by weight based on the composition for forming an active layer:

Chemical Formula 1

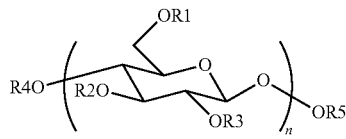

wherein in Chemical Formula 1:
n is the number of a repeating unit, and is an integer of 500 to 3,000; and R1 to R5 are the same as or different from each other, and each independently is hydrogen, an alkyl group, or —(C═O)R6, and R6 is an alkyl group.

Another embodiment of the present specification provides a gas separation membrane including a porous layer; and an active layer including the polymer of Chemical Formula 1 formed on the porous layer, wherein the gas separation membrane has a carbon dioxide selectivity of 5 to 30 based on methane.

Advantageous Effects

A method for preparing a gas separation membrane according to one embodiment of the present specification enhances carbon dioxide selectivity and permeability.

In addition, a gas separation membrane according to one embodiment of the present specification effectively separates carbon dioxide.

DESCRIPTION OF DRAWINGS

FIG. 1 illustrates a gas separation membrane according to one embodiment of the present specification.

FIG. 2 illustrates a gas separation membrane according to another embodiment of the present specification.

REFERENCE NUMERALS 100, 200: Gas Separation Membrane
10: Porous layer
11: Active Layer
12: Gutter Layer
13: Protective Layer

DETAILED DESCRIPTION

In the present specification, a description of a certain member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

Hereinafter, the present specification will be described in more detail.

One embodiment of the present specification provides a method for preparing a gas separation membrane including forming a porous layer by coating a hydrophilic polymer solution on a porous substrate; and forming an active layer by coating a composition for forming an active layer including a polymer of the following Chemical Formula 1 on the porous layer, wherein the polymer of Chemical Formula 1 is included in an amount from 1% by weight to 5% by weight based on the composition for forming an active layer:

Chemical Formula 1

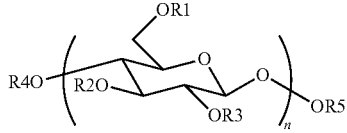

wherein in Chemical Formula 1:

n is the number of a repeating unit, and is an integer of 500 to 3,000, and

R1 to R5 are the same as or different from each other, and each independently is hydrogen, an alkyl group, or —(C=O)R6, and R6 is an alkyl group.

The method for preparing a gas separation membrane according to one embodiment of the present specification uses the polymer of Chemical Formula 1 in the active layer, and, compared to separation membranes using existing active layer materials, has improved results in both carbon dioxide gas permeability and carbon dioxide gas selectivity compared to methane gas.

In addition, the gas separation membrane according to one embodiment of the present specification has excellent carbon dioxide selectivity based on methane compared to when using existing active layer materials, particularly cellulose acetate, even with a small solids content.

According to one embodiment of the present specification, the polymer of Chemical Formula 1 can be included in an amount from 1% by weight to 5% by weight, preferably in an amount from 1.5% by weight to 5% by weight, more preferably in an amount from 1.5% by weight to 2.5% by weight, and even more preferably in an amount from 1.5% by weight to 2% by weight based on the composition for forming an active layer.

When the content of the polymer of Chemical Formula 1 is from 1% by weight to 5% by weight based on the composition for forming an active layer, optimal viscosity and gas permeability are obtained depending on the solids content in the active layer, selectivity for each gas can be maximized.

According to one embodiment of the present specification, the composition for forming an active layer can further include nitromethane. In this case, the nitromethane can be included in an amount from 95% by weight to 99% by weight based on the composition for forming an active layer.

The nitromethane being included in an amount from 97.5% by weight to 98% by weight is effective in obtaining excellent gas permeability/selectivity performance of the coated active layer. When checking viscosity of the nitromethane included in an amount from 95% by weight to 97.5% by weight, it is identified that viscosity increases by approximately 10 times when a concentration of the coating material (polymer of Chemical Formula 1) increases by two times, however, viscosity is constantly maintained even when a shear rate increases, and the coating amount and the active layer thickness can be readily controlled through a slot coating process since a shear-thinning effect does not occur. However, the decision needs to be made carefully considering a molecular weight of a material used for the coating, viscosity when dissolved, and the like.

According to one embodiment of the present specification, the composition for forming an active layer can include the polymer of Chemical Formula 1 and nitromethane. The nitromethane ($CH_3NO_2$) can be included as a solvent for coating acetylated methyl cellulose (AMC). In this case, the nitromethane does not dissolve a porous layer (UF support) structure including polysulfone and thereby does not decrease durability of the porous layer and the gas separation membrane, and enables formation of the active layer including the polymer of Chemical Formula 1. In addition, when forming the active layer, nitromethane (molar mass: 61.04 g/mol, density: 1.1371 g/cm$^3$ (20° C.), melting point: 28.38° C., boiling point: 101.19° C., flash point: 35° C.) volatizes at a low temperature, and constant performance of the gas separation membrane can be secured.

According to another embodiment of the present specification, the composition for forming an active layer can be formed with the polymer of Chemical Formula 1 and nitromethane.

According to one embodiment of the present specification, the composition for forming an active layer can be coated using slot coating. When coating the composition for forming an active layer on the porous layer using slot coating, the thickness of the coated active layer can be readily controlled, and the coating can be conducted under a condition achieving optimal gas separation membrane performance.

According to one embodiment of the present specification, the active layer thickness can be from 0.2 μm to 2 μm depending on the concentration of the composition for forming an active layer and the coating condition. When the active layer thickness is less than 0.2 μm, gas selectivity can decrease, and when the active layer thickness is greater than 2 μm, gas permeability can decrease.

According to one embodiment of the present specification, the alkyl group can be linear or branched, and although not particularly limited thereto, the number of carbon atoms is preferably from 1 to 30. Specifically, the number of carbon atoms is preferably from 1 to 20. More specifically, the number of carbon atoms is preferably from 1 to 10. Specific examples thereof can include a methyl group, an ethyl group, a propyl group, an n-propyl group, an isopropyl group, a butyl group, an n-butyl group, an isobutyl group, a tert-butyl group, a sec-butyl group, a 1-methylbutyl group, a 1-ethylbutyl group, a pentyl group, an n-pentyl group, an isopentyl group; a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethylpropyl group, a 1,1-dimethylpropyl group, an isohexyl group, a 2-methylpentyl group, a 4-methylhexyl group, a 5-methylhexyl group or the like, but are not limited thereto.

According to one embodiment of the present specification, R1 to R5 are the same as or different from each other, and each independently is hydrogen, an alkyl group having 1 to 10 carbon atoms, or —(C=O)R6.

According to one embodiment of the present specification, R1 and R3 to R5 are the same as or different from each other, and each independently is an alkyl group having 1 to 10 carbon atoms.

According to one embodiment of the present specification, R1 and R3 to R5 are a methyl group.

According to one embodiment of the present specification, R2 can be —(C=O)R6.

According to one embodiment of the present specification, R6 is an alkyl group.

According to one embodiment of the present specification, R6 is an alkyl group having 1 to 10 carbon atoms.

According to one embodiment of the present specification, R6 is an ethyl group.

According to one embodiment of the present specification, the polymer of Chemical Formula 1 can be acetylated methyl cellulose (AMC). The acetylated methyl cellulose can be purchased from Lotte Fine Chemical Co., Ltd.

According to one embodiment of the present specification, the polymer of Chemical Formula 1 can have a weight average molecular weight (Mw) of 100,000 to 700,000 g/mol, and preferably 400,000 to 600,000 g/mol.

According to one embodiment of the present specification, the polymer of Chemical Formula 1 can have a number average molecular weight (Mn) of 80,000 to 400,000 g/mol, and preferably 100,000 to 300,000 g/mol.

According to one embodiment of the present specification, molecular weight distribution of the polymer of Chemical Formula 1 (Poly Distribution) can be of a ratio of a weight average molecular weight with respect to a number average molecular weight (Mw/Mn), and Mw/Mn can be from 2 to 4.

According to one embodiment of the present specification, when the average molecular weight and the molecular weight distribution of the polymer of Chemical Formula 1 satisfy the above-mentioned ranges, the polymer of Chemical Formula 1 can increase carbon dioxide gas permeability and can increase carbon dioxide selectivity compared to methane when included in the active layer of the gas separation membrane.

According to one embodiment of the present specification, polysulfone, polyethersulfone, polycarbonate, polyethylene oxide, polyimide, polyetherimide, polyetheretherketone, polypropylene, polymethylpentene, polymethyl chloride, polyvinylidene fluoride or the like can be used as the hydrophilic polymer, however, the hydrophilic polymer is not limited thereto. Specifically, polysulfone can be used as the hydrophilic polymer material.

According to one embodiment of the present specification, the hydrophilic polymer solution can be formed by dissolving a hydrophilic polymer in a solvent. The solvent is not limited as long as it is capable of dissolving a hydrophilic polymer and nitromethane. Examples thereof can include acetone, acetonitrile, tetrahydrofuran (THF), dimethyl sulfoxide (DMSO), dimethylformamide (DMF), hexamethyl-phosphoamide (HMPA) or the like, but are not limited thereto. The hydrophilic polymer can be included in an amount from 12% by weight to 20% by weight based on the hydrophilic polymer solution.

According to one embodiment of the present specification, the porous substrate is not limited as long as it is a material used as a support of a gas separation membrane, and examples thereof can include polyester, polypropylene, nylon, polyethylene or non-woven fabrics, but are not limited thereto. Specifically, non-woven fabrics can be used as the porous substrate.

According to one embodiment of the present specification, the porous layer can be formed by coating the hydrophilic polymer solution on the porous substrate. The porous layer can perform a role of a support of the separation membrane.

According to one embodiment of the present specification, a step of preparing a gutter layer on the porous layer can be further included after the forming of a porous layer and before the forming of an active layer. The gutter layer is formed on the porous layer and enables uniform active layer formation. According to one embodiment of the present specification, materials commonly used in the art can be used as a composition for forming a gutter layer that forms the gutter layer. Specifically, polydimethylsiloxane (PDMS) can be included.

According to one embodiment of the present specification, the polydimethylsiloxane content can be from 0.1% by weight to 2% by weight, and preferably from 0.1% by weight to 1% by weight based on the composition for forming a gutter layer.

According to one embodiment of the present specification, the composition for forming a gutter layer can further include a solvent. In this case, the solvent content can be from 98% by weight to 99.9% by weight and preferably from 99% by weight to 99.9% by weight based on the composition for forming a gutter layer. The solvent can be an organic solvent, and can specifically be hexane.

According to one embodiment of the present specification, the gutter layer thickness can be from 0.01 μm to 1 μm. When the gutter layer thickness satisfies the above-mentioned range, the composition for forming an active layer coated on the gutter layer is uniformly coated, and a uniform active layer can be formed.

According to one embodiment of the present specification, a step of preparing a protective layer on the active layer can be further included after the forming of an active layer. By being coated on the active layer, the protective layer protects a surface of the gas separation membrane and thereby enhances durability and contamination resistance.

According to one embodiment of the present specification, materials commonly used in the art can be used as a composition for forming a protective layer that forms the protective layer. Specifically, polydimethylsiloxane (PDMS) can be included.

According to one embodiment of the present specification, the polydimethylsiloxane content can be from 0.1% by weight to 2% by weight, and preferably from 0.1% by weight to 1% by weight based on the composition for forming a protective layer.

According to one embodiment of the present specification, the composition for forming a protective layer can further include a solvent. In this case, the solvent content can be from 98% by weight to 99.9% by weight and preferably from 99% by weight to 99.9% by weight based on the composition for forming a protective layer. The solvent can be an organic solvent, and can specifically be hexane.

According to one embodiment of the present specification, the protective layer thickness can be from 0.01 μm to 2 μm.

In addition, one embodiment of the present specification provides a gas separation membrane including a porous layer, and an active layer including the polymer of Chemical Formula 1 formed on the porous layer, wherein the gas separation membrane has carbon dioxide selectivity of 5 to 30 based on methane.

According to one embodiment of the present specification, the gas separation membrane can have carbon dioxide permeability of 10 GPU to 150 GPU (Gas Permeation Unit, $10^{-6}$ $cm^3$ (STP)/$cm^2$·cmHg), preferably 80 GPU to 125 GPU, more preferably 100 GPU to 125 GPU, and even more preferably 120 GPU to 125 GPU.

According to one embodiment of the present specification, the gas separation membrane can have methane permeability of 0.5 GPU to 15 GPU, preferably 4 GPU to 5 GPU, and more preferably 4.5 GPU to 5.0 GPU.

According to one embodiment of the present specification, the gas separation membrane can have carbon dioxide selectivity of 10 to 30, preferably 10 to 26.7, and more preferably 25 to 26.7 based on methane.

According to one embodiment of the present specification, the active layer thickness can be from 0.2 μm to 2 μm. When the active layer thickness is less than 0.2 μm, gas selectivity can decrease, and when the active layer thickness is greater than 2 μm, gas permeability can decrease.

According to one embodiment of the present specification, the gas separation membrane can further include a gutter layer. Descriptions on the gutter layer are the same as the descriptions provided above.

According to one embodiment of the present specification, the gas separation membrane can further include a protective layer. Descriptions on the protective layer are the same as the descriptions provided above.

According to one embodiment of the present specification, the gas separation membrane thickness can be from 100 μm to 200 μm. The gas separation membrane thickness being 100 μm or greater is effective in preventing a decrease in the gas selectivity of the separation membrane, and the thickness being 200 μm or less is effective in preventing a decrease in the gas permeability of the gas separation membrane.

According to one embodiment of the present specification, the porous layer thickness can be from 100 μm to 200 μm, but is not limited thereto, and can be adjusted as necessary. In addition, a pore size of the porous layer is preferably from 1 nm to 500 nm, but is not limited thereto.

FIG. 1 illustrates a structure of a gas separation membrane according to one embodiment of the present specification.

FIG. 1 illustrates a gas separation membrane (100) including a porous layer (10) formed by coating a hydrophilic polymer solution on a porous substrate, and an active layer (11) formed by coating a composition for forming an active layer provided on the porous layer (10). The composition for forming an active layer can include the polymer of Chemical Formula 1.

FIG. 2 illustrates a structure of a gas separation membrane according to another embodiment of the present specification.

FIG. 2 illustrates a gas separation membrane (200) including a porous layer (10) formed by coating a hydrophilic polymer solution on a porous substrate, and a gutter layer (12) on the porous layer (10) for forming a uniform active layer, an active layer (11) formed by coating a composition for forming an active layer on the gutter layer (12), and a protective layer (13) on the active layer (11) for protecting a surface of the active layer surface and preventing defects. The composition for forming an active layer can include the polymer of Chemical Formula 1.

Another embodiment of the present specification provides a gas separation membrane module including the gas separation membrane described above.

Another embodiment of the present specification provides a gas separation membrane apparatus including one or more of the gas separation membrane modules described above.

Hereinafter, the present specification will be described in detail with reference to examples. However, the examples according to the present specification can be modified to various other forms, and the scope of the present specification is not to be construed as being limited to the examples described below. Examples of the present specification are provided in order to more fully describe the present specification to those having average knowledge in the art.

PREPARATION EXAMPLE

Preparation of Porous Layer

18% by weight of polysulfone solid was introduced to a N,N-dimethylformamide (DMF) solvent and dissolved for 12 hours or longer at 80° C. to obtain a uniform liquid phase. This solution was cast to a thickness of 50 μm on a non-woven fabric having a thickness of 100 μm made of polyester to form a polysulfone porous layer.

Example 1

For forming a gutter layer, a solution of polydimethylsiloxane (PDMS, 1% by weight) and hexane (99% by weight) was coated on the polysulfone porous layer prepared in the preparation example, and the result was dried for 0.5 minutes in a 60° C. oven. Subsequently, for forming an active layer, a composition solution for forming an active layer including acetylated methyl cellulose (AMC, 5% by weight) and nitromethane (95% by weight) was coated on the porous polysulfone support/gutter layer using slot coating, and the result was dried for 2 minutes in a 60° C. oven. For forming a protective layer, a solution of polydimethylsiloxane (PDMS, 1% by weight) and hexane (99% by weight) was coated on the active layer surface, and the result was dried for 1 minute in a 60° C. oven, and a gas separation membrane was prepared.

Example 2

A gas separation membrane was prepared in the same manner as in Example 1, except that the acetylated methyl cellulose (AMC) was used in an amount of 2.5% by weight instead of 5% by weight.

Example 3

A gas separation membrane was prepared in the same manner as in Example 1, except that the acetylated methyl cellulose (AMC) was used in an amount of 2.0% by weight instead of 5% by weight.

Example 4

A gas separation membrane was prepared in the same manner as in Example 1, except that the acetylated methyl cellulose (AMC) was used in an amount of 1.75% by weight instead of 5% by weight.

Example 5

A gas separation membrane was prepared in the same manner as in Example 1, except that the acetylated methyl cellulose (AMC) was used in an amount of 1.5% by weight instead of 5% by weight.

Example 6

A gas separation membrane was prepared in the same manner as in Example 1, except that the acetylated methyl cellulose (AMC) was used in an amount of 1.0% by weight instead of 5% by weight.

Comparative Example 1

A gas separation membrane was prepared in the same manner as in Example 1, except that cellulose acetate was used in 5% by weight instead of using the acetylated methyl cellulose (AMC) in an amount of 5% by weight.

Comparative Example 2

A gas separation membrane was prepared in the same manner as in Example 1, except that cellulose acetate was used in an amount of 2.5% by weight instead of using the acetylated methyl cellulose (AMC) in an amount of 5% by weight.

Comparative Example 3

A gas separation membrane was prepared in the same manner as in Example 1, except that cellulose acetate was used in an amount of 1.0% by weight instead of using the acetylated methyl cellulose (AMC) in an amount of 5% by weight.

Comparative Example 4

A gas separation membrane was prepared in the same manner as in Example 1, except that the acetylated methyl cellulose (AMC) was used in an amount of 0.5% by weight instead of 5% by weight.

Comparative Example 5

A gas separation membrane was prepared in the same manner as in Example 1, except that the acetylated methyl cellulose (AMC) was used in an amount of 10% by weight instead of 5% by weight.

Experimental Example

The gas separation membranes prepared in Examples 1 to 6 and Comparative Examples 1 to 5 were evaluated. Gas permeation resulting from a pressure difference between an upper part and a lower part of the membrane was induced by injecting a gas to the upper part of a gas permeating cell at a constant pressure (50 psi, 80 psi, 100 psi, 200 psi and the like) (1 psi=6,895 Pa) using a pressure regulator at room temperature. Herein, a flow rate of the gas permeating the separation membrane was measured using a bubble flowmeter, and permeability of the separation membrane was measured considering a stabilization time (>1 hour). Results of measuring gas permeability are described in the following Table 1.

TABLE 1

| Active Layer Polymer Material | Content (% by Weight) | $P_{CO2}$ (GPU) | $P_{CH4}$ (GPU) | Selectivity ($CO_2/CH_4$) |
|---|---|---|---|---|
| Example 1 | AMC | 5 | 10 | 0.5 | 20 |
| Example 2 | AMC | 2.5 | 80 | 8 | 10 |
| Example 3 | AMC | 2.0 | 100 | 4 | 25 |
| Example 4 | AMC | 1.75 | 120 | 4.5 | 26.7 |
| Example 5 | AMC | 1.5 | 125 | 5.0 | 25 |
| Example 6 | AMC | 1.0 | 150 | 15 | 10 |
| Comparative Example 1 | Cellulose Acetate | 5 | 6 | 3 | 2 |
| Comparative Example 2 | Cellulose Acetate | 2.5 | 20 | 4 | 5 |
| Comparative Example 3 | Cellulose Acetate | 1.0 | 60 | 15 | 4 |
| Comparative Example 4 | AMC | 0.5 | 250 | 50 | 5 |
| Comparative Example 5 | AMC | 10 | 2 | 0.1 | 20 |

The $P_{CO2}$ and the $P_{CH4}$ mean permeability of $CO_2$ and $CH_4$, respectively, and the $CO_2/CH_4$ selectivity means gas selectivity of carbon dioxide gas based on methane gas.

According to Table 1, the gas separation membranes according to Examples 1 to 6 had carbon dioxide selectivity of 10 or greater based on methane, and the gas separation membrane including the active layer using acetylated methyl cellulose (AMC) exhibited results of excellent carbon dioxide permeability and selectivity.

The gas separation membrane including the active layer using AMC according to Example 1 had higher carbon dioxide permeability and lower methane permeability compared to the gas separation membrane including the active layer using cellulose acetate according to Comparative Example 1, and had $CO_2/CH_4$ selectivity enhanced by 10 times or higher.

Likewise, the gas separation membranes including the active layer using AMC according to Examples 2 and 6 had higher carbon dioxide permeability than methane permeability compared to the gas separation membranes including the active layer using cellulose acetate according to Comparative Examples 2 and 3, respectively, and had $CO_2/CH_4$ selectivity enhanced by 2 times or higher.

In addition, the gas separation membranes including the active layer using AMC according to Examples 3 and 6 had carbon dioxide permeability of 100 GPU or greater, and exhibited significantly superior carbon dioxide permeability compared to the gas separation membranes including cellulose acetate.

Particularly, the gas separation membranes prepared to have an amount of AMC in greater than or equal to 1.5% by weight and less than or equal to 2.0% by weight according to Examples 3 to 5 had $CO_2/CH_4$ selectivity of 25 or higher, and exhibited significantly superior $CO_2/CH_4$ selectivity compared to the gas separation membranes including cellulose acetate.

Meanwhile, it was identified that Comparative Example 4 having the AMC content of less than 1% by weight had $CO_2/CH_4$ selectivity decreasing to approximately half of Example 1. In addition, it was identified that Comparative Example 5 having the AMC content of greater than 5% by weight had similar $CO_2/CH_4$ selectivity to Example 1, but had significantly lower carbon dioxide and methane permeability compared to Example 1.

Hereinbefore, preferred embodiments of the present disclosure have been described, however, the present disclosure is not limited thereto, and various modifications can be made within the scope of the claims and the detailed descriptions of the invention, and these also fall within the scope of the disclosure.

The invention claimed is:

1. A method for preparing a gas separation membrane, comprising:
   forming a porous layer by coating a hydrophilic polymer solution on a porous substrate; and
   forming an active layer by coating a composition for forming an active layer including a polymer of the following Chemical Formula 1 on the porous layer,
   wherein the polymer of Chemical Formula 1 is included in an amount from 1% by weight to 5% by weight based on the composition for forming an active layer:

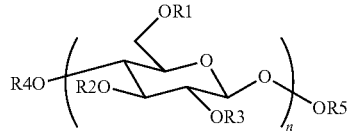

Chemical Formula 1 wherein in Chemical Formula 1:
n is a number of a repeating unit, and is an integer of 500 to 3,000; and
R1 to R5 are the same as or different from each other, and each independently is hydrogen, an alkyl group, or —(C═O)R6, and R6 is an alkyl group.

2. The method of claim 1, wherein the composition for forming an active layer further includes nitromethane.

3. The method of claim 1, wherein the coating of the composition for forming an active layer is performed using slot coating.

4. The method of claim 1, wherein each of R1 and R3 to R5 is an alkyl group, and R2 is —(C=O)R6.

5. The method of claim 1, wherein the hydrophilic polymer is polysulfone, polyethersulfone, polycarbonate, polyethylene oxide, polyimide, polyetherimide, polyetheretherketone, polypropylene, polymethylpentene, polymethyl chloride or polyvinylidene fluoride.

6. The method of claim 1, wherein the polymer of Chemical Formula 1 has a weight average molecular weight (Mw) of 100,000 to 700,000 g/mol.

7. The method of claim 1, wherein the polymer of Chemical Formula 1 has a number average molecular weight (Mn) of 80,000 to 400,000 g/mol.

8. The method of claim 1, further comprising preparing a gutter layer on the porous layer after the forming of the porous layer and before the forming of the active layer.

9. The method of claim 1, further comprising preparing a protective layer on the active layer after the forming of the active layer.

10. A gas separation membrane comprising:
a porous layer; and
an active layer including a polymer of the following Chemical Formula 1 formed on the porous layer, wherein the gas separation membrane has a carbon dioxide selectivity of 5 to 30 based on methane:

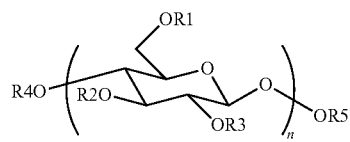

Chemical Formula 1 wherein in Chemical Formula 1:
n is the number of a repeating unit, and is an integer of 500 to 3,000;
R1 and R3 to R5 are the same as or different from each other, and each independently, is an alkyl group having 1 to 10 carbon atoms; and
R2 is —(C=O)R6, and R6 is an alkyl group.

11. The gas separation membrane of claim 10, which has a carbon dioxide selectivity of 10 to 26.7 based on the methane.

12. The gas separation membrane of claim 10, wherein R1 and R3 to R5 are a methyl group.

13. The gas separation membrane of claim 10, wherein R6 is an ethyl group.

* * * * *